(12) United States Patent  
Odai et al.

(10) Patent No.: US 6,961,201 B2
(45) Date of Patent: Nov. 1, 2005

(54) MAGNETIC DISK APPARATUS

(75) Inventors: Masaki Odai, Chiyoda (JP); Kyo Akagi, Fuchu (JP); Ryuji Tsuchiyama, Matsudo (JP)

(73) Assignee: Hitachi Ltd., Tokyo (JP)

( * ) Notice: Subject to any disclaimer, the term of this patent is extended or adjusted under 35 U.S.C. 154(b) by 141 days.

(21) Appl. No.: 10/425,677

(22) Filed: Apr. 30, 2003

(65) Prior Publication Data

US 2004/0057150 A1 Mar. 25, 2004

(30) Foreign Application Priority Data

Sep. 19, 2002 (JP) ............................. 2002-272440

(51) Int. Cl.$^7$ ............................................. G11B 19/28
(52) U.S. Cl. ................................. 360/73.03; 360/75
(58) Field of Search ........................... 360/73.03, 69, 360/71, 75; 310/67 R, 68 R, 74; 318/376; 713/323–324

(56) References Cited

U.S. PATENT DOCUMENTS

| | | | | |
|---|---|---|---|---|
| 4,481,449 A | * | 11/1984 | Rodal | 360/71 |
| 5,455,496 A | * | 10/1995 | Williams et al. | 360/75 |
| 6,134,069 A | * | 10/2000 | Catalano et al. | 360/73.03 |
| 6,285,521 B1 | * | 9/2001 | Hussein | 360/73.03 |
| 6,628,470 B1 | * | 9/2003 | Fujimori | 360/73.03 |

FOREIGN PATENT DOCUMENTS

| | | |
|---|---|---|
| JP | 9-120617 | 5/1997 |
| JP | 09147470 A * | 6/1997 |

* cited by examiner

*Primary Examiner*—David Hudspeth
*Assistant Examiner*—James L. Habermehl
(74) *Attorney, Agent, or Firm*—McDermott Will & Emery LLP

(57) ABSTRACT

A magnetic disk apparatus includes a low-rotation mode for decreasing the revolution number of a disk, in the low-rotation mode, any control signal for decelerating the disk is not generated to permit it to be decelerated owing to inertial drive and when a detected speed falls below a target speed, the disk is accelerated to thereby realize power saving.

4 Claims, 6 Drawing Sheets

FIG.4

| 115:COMMAND | | 202:NORMAL MODE COMMAND | | | | | | 203:LOW-ROTATION MODE COMMAND | |
|---|---|---|---|---|---|---|---|---|---|
| 211:IN-LOW-ROTATION MODE STATE | | | | | | | | 210: INERTIAL DRIVE | 209: ACCEL-ERATION |
| STATE | | I | II | III | IV | V | VI | X | I~VI |
| 311: SWITCH | 301:U-PHASE | OFF | OFF | OFF | ON | ON | OFF | OFF | OFF/ON |
| | 302:V-PHASE | ON | OFF | OFF | OFF | OFF | ON | OFF | ON/OFF |
| | 303:W-PHASE | OFF | ON | ON | OFF | OFF | OFF | OFF | OFF/ON |
| 312: SWITCH | 301:U-PHASE | ON | ON | OFF | ON | OFF | OFF | OFF | ON/OFF |
| | 302:V-PHASE | OFF | OFF | ON | OFF | ON | ON | OFF | OFF/ON |
| | 303:W-PHASE | OFF | OFF | OFF | OFF | OFF | ON | OFF | OFF/ON |
| 313: SWITCH | 301:U-PHASE | OFF | ON | OFF | ON | ON | OFF | ON | ON |
| | 302:V-PHASE | OFF | OFF | OFF | OFF | OFF | OFF | OFF | OFF |
| | 303:W-PHASE | ON | OFF | OFF | OFF | OFF | OFF | OFF | OFF |

MAGNETIC DISK APPARATUS

BACKGROUND OF THE INVENTION

The present invention relates to a technique for saving electric power in a magnetic disk apparatus. Especially, this invention is suitable for use in a mobile/wearable appliance in which power saving is needed.

With a view to reducing power consumption and speeding up transfer of data in a disk drive apparatus using a flexible disk medium, a technique has been known in which a first-read memory/buffer is prepared, data recorded in the vicinity of data finally demanded is read out of a disk and kept in save in the first-read memory/buffer and rotation drive of the disk is stopped until the data kept in save in the first-read memory/buffer is used or another kind of data is required. This known technique is described in JP-A-9-120617.

A magnetic disk apparatus has been used as a large-capacity memory device in a battery-driven apparatus including a notebook-sized personal computer. In the battery-driven apparatus and the magnetic disk apparatus built therein, power saving is needed for the purpose of increasing usable time assured by one charging operation. In a conventionally known method in which rotation of the disk is stopped during stoppage of recording/reproduction, there arises a problem that when a request for recording/reproduction is made with the disk placed in stop condition, much time is required and high power is consumed to start operation. Further, in the magnetic disk apparatus, the head has to be set back to a retreat position and time is also consumed for this purpose. Accordingly, frequent retreat of the head cannot be allowed.

BRIEF SUMMARY OF THE INVENTION

An object of the invention is to provide a magnetic disk apparatus which can decrease time required for starting operation from a state of power saving mode and besides can promote power saving.

To accomplish the above object, according to the present invention, a mode of decreasing the number of revolution of a disk without stopping it is provided in a time zone in which any request for recording/reproduction is not made. In this mode, any control signal for decelerating the disk is not generated to permit it to be decelerated owing to inertial drive and when a detected speed falls below a target speed, the disk is accelerated. Preferably, a charging unit may be provided which charges a regenerated current due to a deceleration.

Other objects, features and advantages of the invention will become apparent from the following description of the embodiments of the invention taken in conjunction with the accompanying drawings.

BRIEF DESCRIPTION OF THE SEVERAL VIEWS OF THE DRAWING

FIG. 4 is a table for explaining the operation of the magnetic disk apparatus.

DETAILED DESCRIPTION OF THE INVENTION

The present invention will now be described by way of example with reference to the accompanying drawings.

Figure 1:
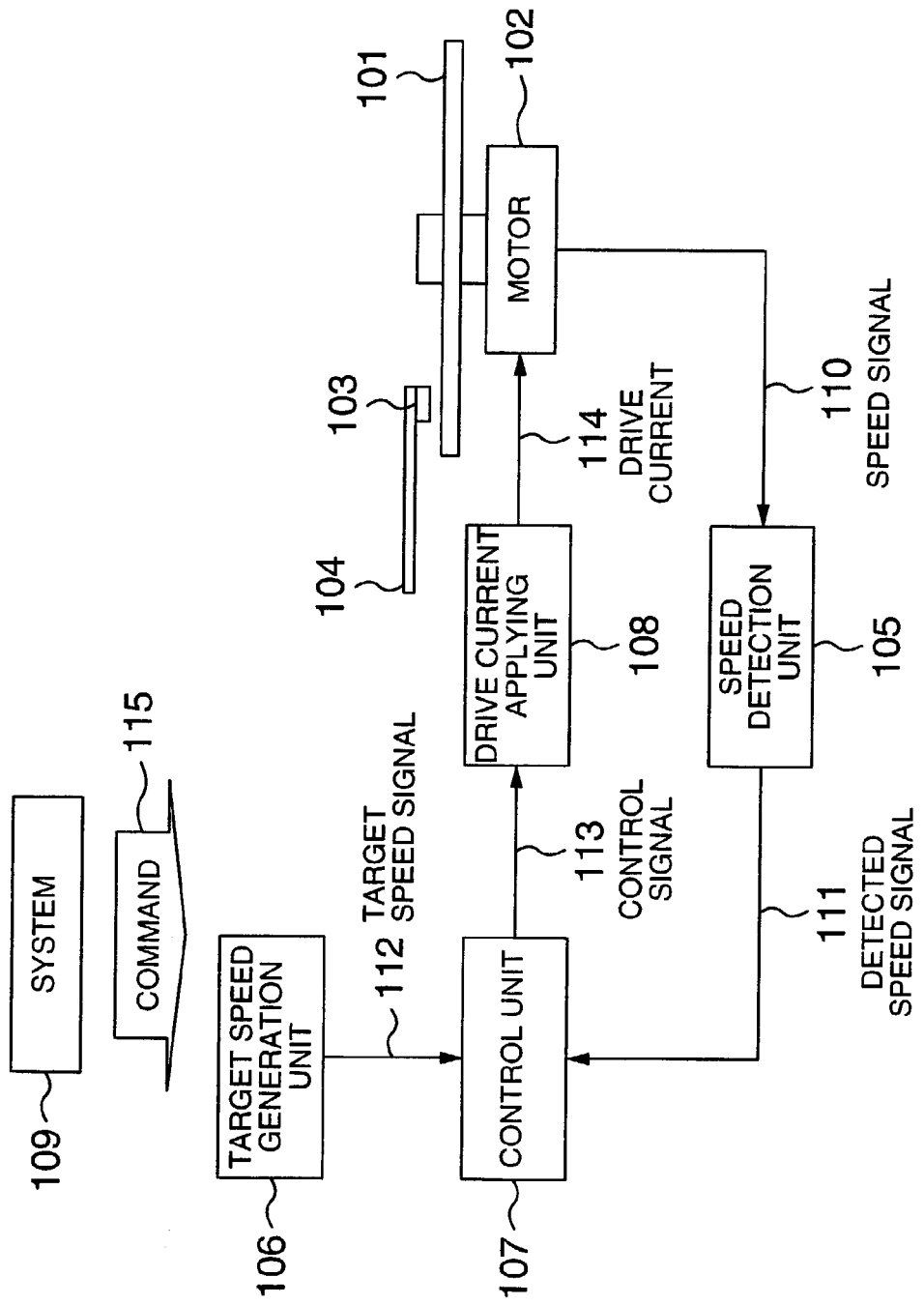
FIG. 1 is a block diagram showing an embodiment of a magnetic disk apparatus according to the invention.

Referring first to FIG. 1 showing, in block diagram form, an embodiment of a magnetic disk apparatus according to the invention, a fundamental construction of the invention will be described prior to giving a concrete description of the invention.

The magnetic disk apparatus shown in FIG. 1 comprises a disk 101 for recording data and a head 103 for recording/reproducing operation of data. The disk 101 is driven to rotate by a motor 102 and the head 103 is moved by means of an actuator 104. During recording/reproduction, the head 103 is positioned with high accuracy to a designated position on the disk 101 and power is consumed for this purpose in the actuator 104. Similarly, the motor 102 is controlled. A speed detection unit 105 responds to a speed signal 110 generated by the motor 102 to generate a detected speed signal 111. A control unit 107 responds to the detected speed signal 111 and a target speed signal 112 generated by a target speed generation unit 106 to generate a control signal 113. A drive current applying unit 108 responds to the control signal 113 to create a drive current 114 which in turn is applied to the motor 102. A system 109 decides use conditions or the like of the apparatus to generate commands 115 complying with operations such as for example stop and start of the motor and supplies the commands to the individual units.

The system 109 referred to herein has a low-rotation mode. When the low-rotation mode is designated by reason that any recording/reproducing operation is unnecessary for a while, the system 109 supplies to the target speed generation unit 106 a command 115 for generation of a target speed signal 112 smaller than that during recording/reproduction and supplies to the drive current applying unit 108 and speed detection unit 105 a command 115 complying with a decrease in rotation speed of the motor 102.

The present invention can attain such beneficial effects that by rotating the disk 101 and motor 102 at a low rotation speed in the low-rotation mode, low power consumption can be assured, return to a recordable/reproducible state can be done at a higher speed than that when the disk 101 and motor 102 are stopped and power consumption during the return can be reduced.

Figure 2:
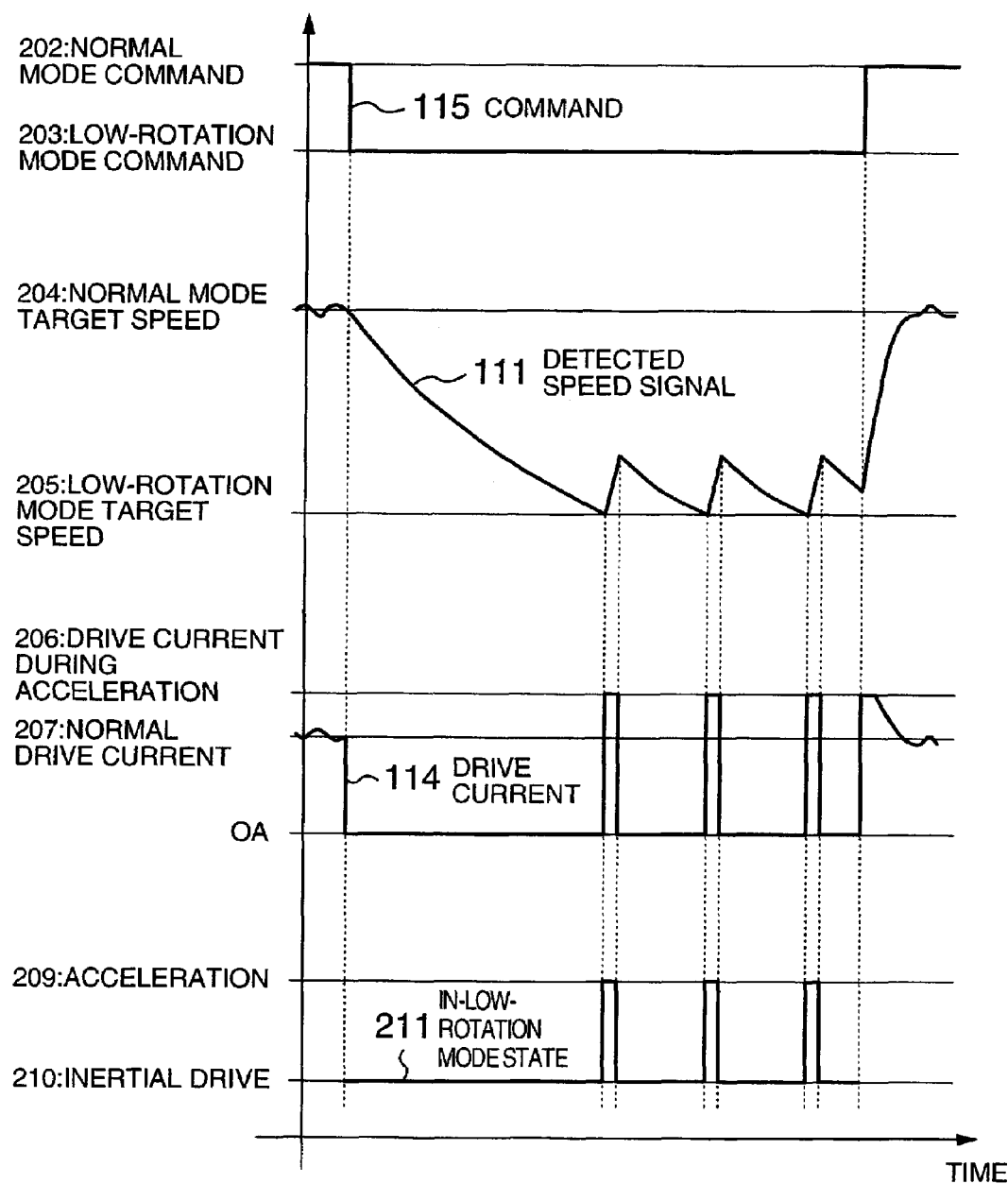
FIG. 2 is a time chart showing response waveforms in operation of the magnetic disk apparatus.

Referring to FIG. 2, there is illustrated an example of a speed profile in the low-rotation mode. Assumptively, the recordable/reproducible state corresponds to a normal operation. Then, the motor 102 rotates at a constant speed in the normal operation. Therefore, the target speed signal 112 has a constant value and typically, the control unit 107 generates a control signal 113 for acceleration and deceleration that makes zero the difference between the target speed signal 112 and a detected speed signal 111. In the low-rotation mode, the control for deceleration is not carried out and a deceleration attributable to inertial drive 210 proceeds. As the detected speed signal 111 falls below a low-rotation mode target speed 205, state 211 in the low-rotation mode assumes an accelerated state 209, so that a drive current 114 for accelerated operation is delivered. For this acceleration 209, typical speed control based on a closed loop may be employed but alternatively, an acceleration operation may suffice which is based on an open loop for supplying a constant drive current 206 for a constant time.

Figure 3:
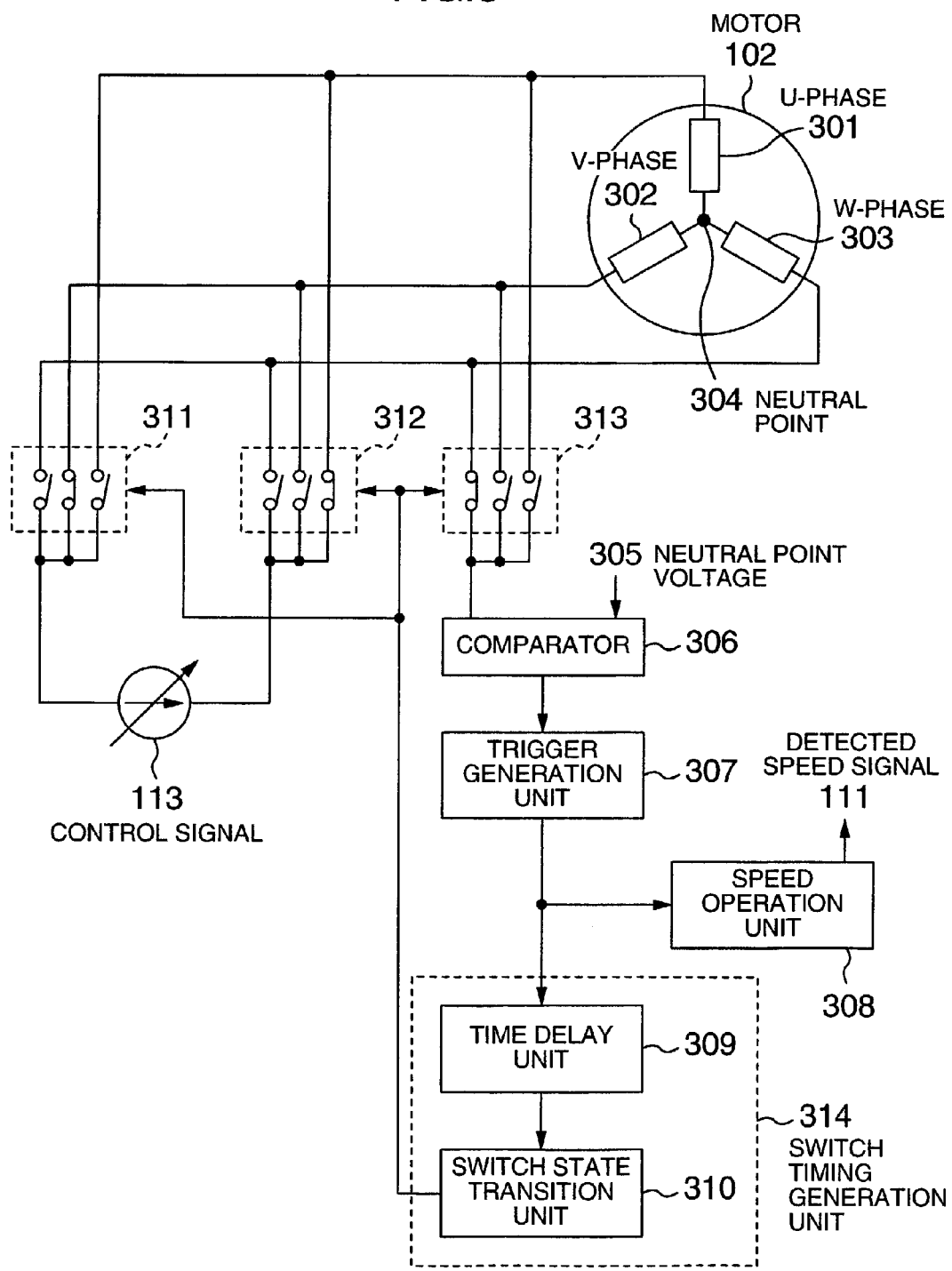
FIG. 3 is a construction diagram of a circuit in the magnetic disk apparatus.

Referring to FIG. 3, there is illustrated an example of a circuit construction of the drive current application unit 108 and speed detection unit 105 when the motor 102 is a typically usable three-phase brushless DC motor. The three-phase brushless motor 102 has a three-phase armature of U-phase 301, V-phase 302 and W-phase 303 and a neutral point 304 and is caused to rotate by applying a current across phases (interphase current) complying with a rotor position of the motor 102. Since the input represented by a control signal (drive current command) 113 is a DC signal, switches 311 and 312 are used to apply the control signal across phases complying with the rotor position, that is, between the U-phase 301 and V-phase 302 in FIG. 3. The switches 311 and 312 will be described later.

A transition time Tphase for the drive current applied interphase is expressed by Expression 1:

$$T\text{phase} = 1/(3 \, r \, Np) \quad (1)$$

where the number of poles of the motor 102 is Np and the target speed signal 112 is r[Hz].

The drive current applied interphase is controlled by means of a switch timing generation unit 314. Firstly, in a phase not applied with the drive current, that is, the W-phase in FIG. 3, a counter electromotive force is generated. Time Tdelay for the counter electromotive force to assume a voltage at the neutral point 304 is theoretically half the Tphase as indicated in Expression 2:

$$T\text{delay} = 0.5 \, T\text{phase} = 1/(6 \, r \, Np) \quad (2)$$

and this nature is utilized.

A switch 313 turns on the phase not applied with the dive current to deliver the counter electromotive force to a comparator 306. The comparator 306 compares the counter electromotive force with a neutral point voltage 305 and a comparison result causes a trigger generation unit 307 to generate a trigger at such a timing that the counter electromotive force is on its excursion across the neutral point voltage. As the neutral point voltage 305, either an actual voltage at the neutral point 304 or a theoretical neutral point voltage may be used. A speed operation unit 308 measures time Ttrig between the start of state transition and the generation of the trigger to deliver a detected speed 111. The detected speed as represent by R can be obtained from Expression 3:

$$R = 1/(6 \, Np \, T\text{trig}) \quad (3)$$

On the other hand, the trigger generated by the trigger generation unit 307 is delayed by Tdelay by means of a time delay unit 309 so as to be inputted to a switch state transition unit 310, with the result that the switches 311, 312 and 313 are changed to change and shift the phases across which the control signal 113 is applied.

A table depicted in FIG. 4 shows states under the commands designated by 115 in FIGS. 1 and 2. For better understanding, reference numerals of components shown in FIGS. 1, 2 and 3 are remarked in FIG. 4. Firstly, in the case of a normal mode command 202, the state sequentially shifts from state I to state VI to rotate the motor. For example, in the case of the state being I, the switches are operated as shown in FIG. 3, with the switch 311 having its contact of V-phase 302 turned on and the switch 312 having its contact of U-phase 301 turned on to thereby apply the control signal 113 from U-phase 301 to V-phase 302. In this phase, the switch 313 has its contact of W-phase 303 turned on, thereby ensuring that by observing a counter electromotive force in the W-phase 303, timing for speed detection and transition to the next state II can be generated. Accordingly, during one round of rotation of 2/Np, switching and timing operation and speed operation are carried out six times. Next, low mode command 203 of the present invention is sorted into a command for operation at the time of inertial drive 210 and a command for operation at the time of acceleration 209. In the inertial drive 210, the drive current 114 is 0 (zero) A and all of the switches 311 and 312 are turned off and the timing operation and switching need not be carried out. In the acceleration 209, like the operation under the normal mode command 202, an acceleration operation is done through transition from state I to state VI. But, in this phase, speed control is not carried out and application based on the open loop suffices. Further, in the low-rotation mode command 203, such stringent speed control as that in the case of the normal mode command 202 is not necessary and hence switching of the switch 313 can be stopped. For example, when only the U-phase 301 is turned in FIG. 4 and the time between triggers generated by the trigger generation unit 307 is Ttrig2, the detected speed 111 can be calculated from Expression 4:

$$R = 1/(Np \, T\text{trig}2) \quad (4)$$

By virtue of this, the low-speed rotation leading to low power consumption can give rise to low power consumption in the motor as well as low power consumption attributable to partial stoppage of the drive circuit.

Figure 5:
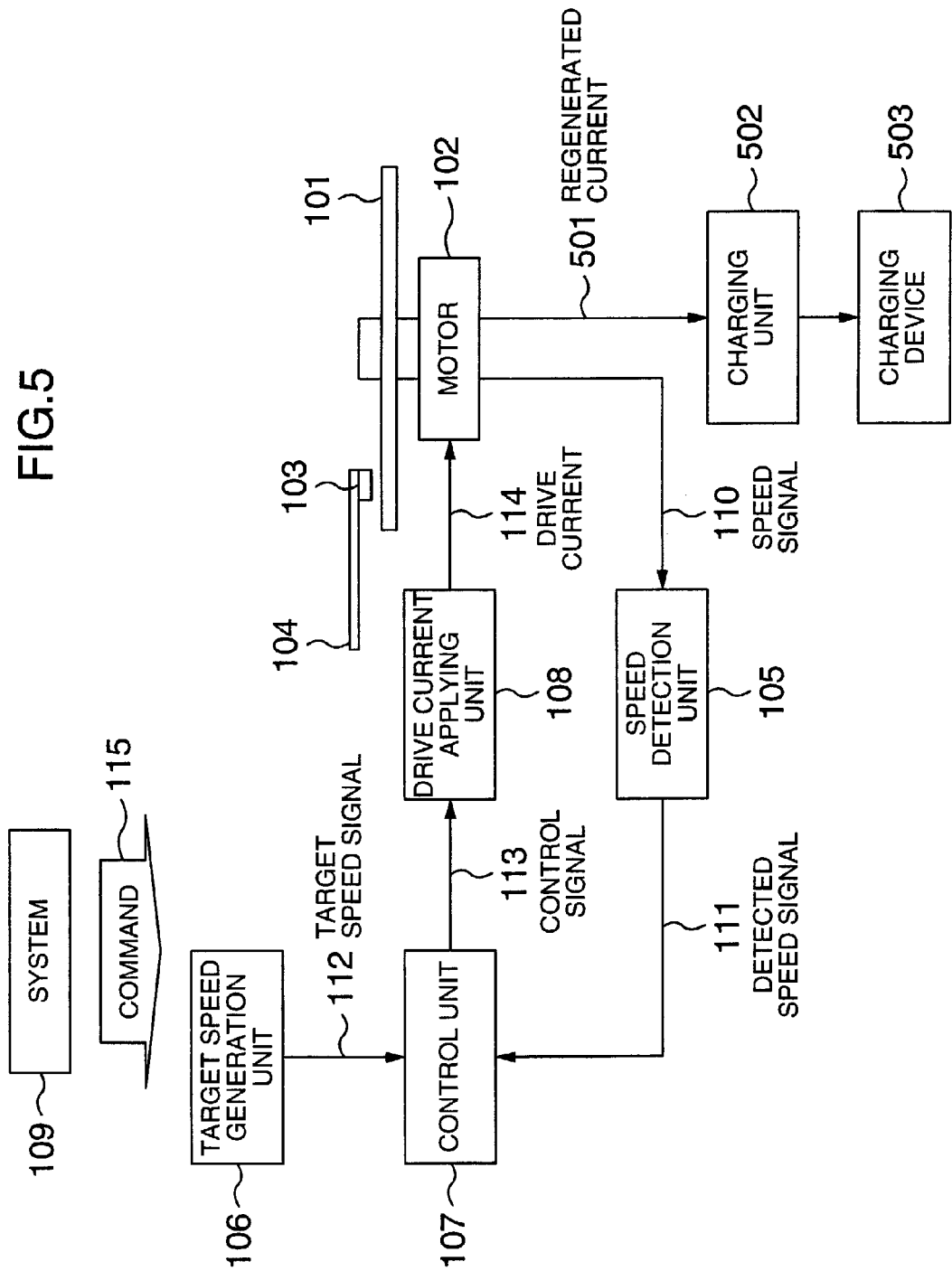
FIG. 5 is a block diagram showing another embodiment of the magnetic disk apparatus according to the invention.

Referring to FIG. 5, there is illustrated, in block diagram form, another embodiment of the invention. The present embodiment has the same fundamental construction as that shown in FIG. 1 but it additionally has a charging device 503 such as capacitor or secondary battery in the magnetic disk apparatus or an apparatus using the magnetic disk apparatus, so that a regenerated current 501 of motor 102 can be charged using a charging unit 502. During the low-rotation mode command 203 and the disk stoppage as shown in FIG. 2, the inertial drive 210 proceeds. In the inertial drive, any drive current 114 is not applied to the motor 102, with the result that the disk 101 and motor 102 are rotated by their inertia and the motor 102 behaves as a generator. The charging unit 502 takes out the regenerated current 501 and charges it in the charging device 503. Through this, it is possible to make full use of energy discarded wastefully, especially, during the disk stoppage and the apparatus as a whole can be constructed as a power saving system.

Figure 6:
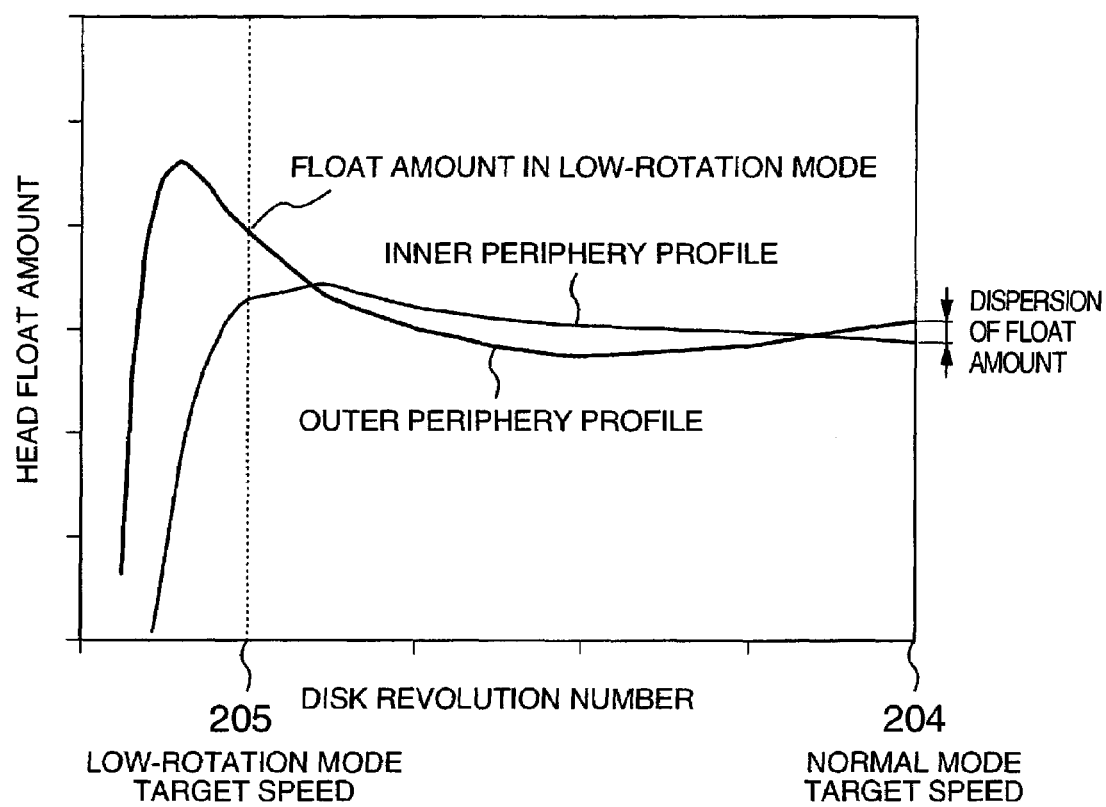
FIG. 6 is a graphic representation showing characteristics of the head float amount and the disk revolution number.

Referring to FIG. 6, there is illustrated, in graphical form, an example of the relation between the head float amount and the disk revolution number according to the invention. The head 103 is floating above the disk 101. The amount of head float changes its magnitude in accordance with the disk revolution number. In addition, even for the same disk revolution number, the head float amount differs with a position on the disk 101 above which the head floats. For example, an angle made by the actuator 104 to the peripheral velocity and rotation direction differs for the outer periphery and the inner periphery and the head float amount also varies and as a result, the profile in relation to the disk revolution number also changes to take either an outer periphery profile or an inner periphery profile. The typical magnetic disk apparatus has, in the low-rotation region, a region in which a head float amount larger than that at the normal mode target speed 204 for recording/reproduction can be obtained and especially, such a region takes place eminently at the outer periphery. Generally, the head float is so designed that the dispersion of float amount can be small at the head position corresponding to the normal mode target speed 204. In the present invention, the low-rotation mode target speed 205 is so set as to correspond to the region where the head float amount increases and the position of head 103 above the disk 101 is also so set as to correspond to the position where the head float amount particularly increases. For example, in case the dispersion of float amount is 1 nm and the head float amount in the low-rotation region is raised eminently at the outer periphery, a disk revolution number, at which the low-rotation mode float amount on the outer periphery profile is 3 nm or more that is three times the dispersion of float amount as compared to the head float amount at the normal mode target speed 204, is set as the low-rotation mode target speed 205 and the head position under the low-rotation mode command 203 is set to the outer periphery. Through this, the head float amount under the low-rotation mode command 203 becomes larger than that under the normal mode command 202 and the probability that the head 103 makes contact to the disk 101 can be reduced to thereby promote the reliability of the magnetic disk apparatus. Further, the head may be retreated to keep clear of the disk 101 under the low-rotation mode command 203.

When recording/reproduction does not proceed, the low-rotation mode for decreasing the revolution number of the disk enters to decrease the power consumption and in comparison with the complete stoppage, power required for return or reset and time consumed for the return can be decreased. Further, in the low-rotation mode, the inertial drive and acceleration are repeated but the speed control need not be done to attain low power consumption in the driver circuit. In this phase, charging can proceed during the inertial drive.

It should be further understood by those skilled in the art that although the foregoing description has been made on embodiments of the invention, the invention is not limited thereto and various changes and modifications may be made without departing from the spirit of the invention and the scope of the appended claims.

What is claimed is:

1. A magnetic disk apparatus comprising a disk for recording data, a motor for rotating said disk, speed detection means for detecting a speed of said motor and generating a detected speed signal, target speed generation means for generating a target speed signal of said motor, motor control means for generating a control signal of said motor on the basis of the target speed signal and the detected speed signal, a head for recording/reproducing data on/from said disk, and an actuator for moving said head, wherein:

said apparatus has a low-rotation mode for decreasing the revolution number of said disk when data is neither recorded nor reproduced, in said low-rotation mode, any control signal for decelerating said disk is not generated by said motor control means to permit the disk to be decelerated by inertia, and said disk is accelerated when the detected speed falls below a target speed, and said head floats above said disk when recording/reproducing data, and during said low-rotation mode, said head moves to a periphery part of said disk, and said target speed is set at a revolution number that corresponds to a float amount of said head larger than the float amount during recording/reproducing data.

2. A magnetic disk apparatus according to claim 1, wherein said head is retreated from outside said disk at said low-rotation mode.

3. A magnetic disk apparatus comprising a disk for recording data, a motor for rotating said disk, speed detection means for detecting a speed of said motor and generating a detected speed signal, target speed generation means for generating a target speed signal of said motor, motor control means for generating a control signal of said motor on the basis of the target speed signal and detected speed signal, a head for recording/reproducing data on/from said disk, and an actuator for moving said head, wherein:

said apparatus has a low-rotation mode for decreasing the revolution number of said disk in a time in which data is neither recorded nor reproduced, and in said low-rotation mode, any control signal for decelerating said disk is not generated by said motor control means to permit it to be decelerated owing to inertial drive and said disk is accelerated when a detected speed falls below a target speed, and wherein rechargeable power supply means for supplying part or whole of usable electric power is provided in said magnetic disk apparatus or in an external apparatus connected to the magnetic disk apparatus, and a charging current is generated during an inertial drive to charge said rechargeable power supply means.

4. A magnetic disk apparatus according to claim 3, wherein a current is generated when stopping said disk for charging said rechargeable power supply means.

* * * * *